F. WATSON.
WAGON BRAKE.
APPLICATION FILED APR. 21, 1915.

1,155,453.

Patented Oct. 5, 1915.

Inventor
F. WATSON
By Watson E. Coleman
Attorney

UNITED STATES PATENT OFFICE.

FIRDIA WATSON, OF CASS, ARKANSAS.

WAGON-BRAKE.

1,155,453.  Specification of Letters Patent.  Patented Oct. 5, 1915.

Application filed April 21, 1915. Serial No. 22,920.

*To all whom it may concern:*

Be it known that I, FIRDIA WATSON, a citizen of the United States, residing at Cass, in the county of Franklin and State of Arkansas, have invented certain new and useful Improvements in Wagon-Brakes, of which the following is a specification, reference being had to the accompanying drawings.

The present invention relates to new and useful improvements in wagon brakes and as its principal object aims to provide a device of this character which may be operated from the driver's seat of the vehicle or readily transformed into a brake of the type which is set by a lever extending rearwardly from the wagon.

Another object is to provide a braking mechanism which is particularly adapted for use in connection with logging wagons.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

Figure 1:
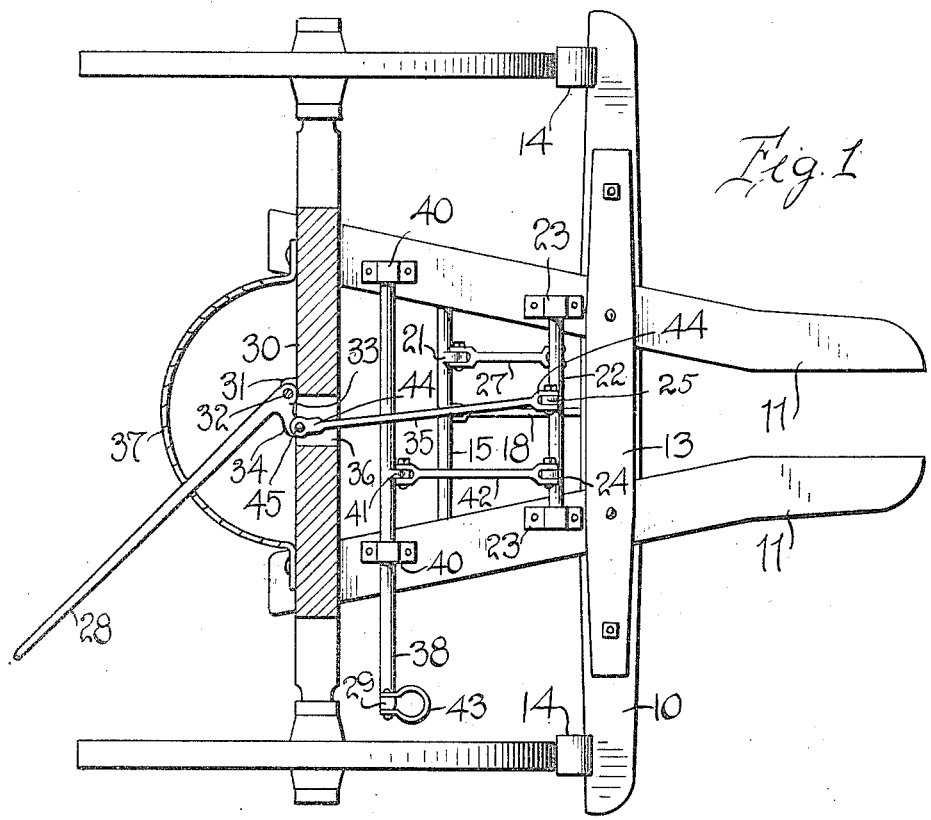
Figure 2:
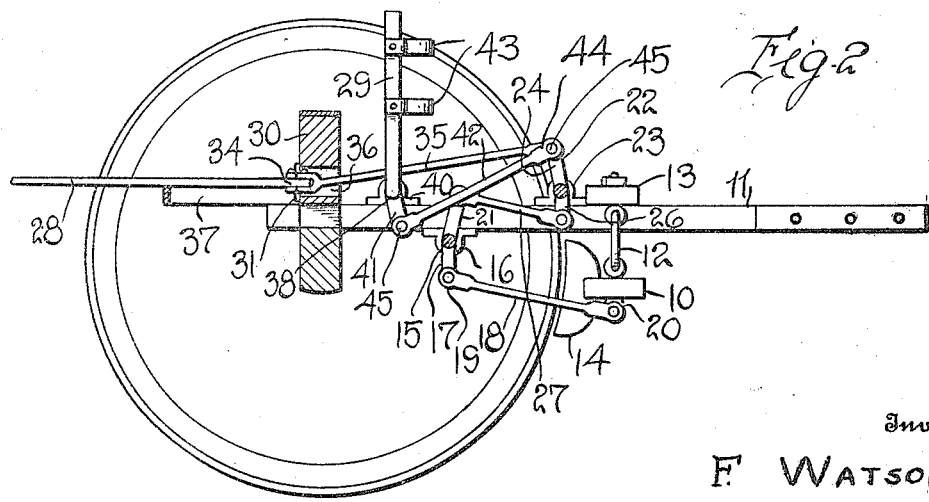

With reference to the drawings, wherein there has been illustrated the preferred embodiment of this invention, as it is reduced to practice, and throughout the several views of which similar reference numerals designate corresponding parts, Figure 1 is a top plan view of the rear hound and the wheels of the vehicle with the brake mechanism applied thereto, the rear bolster being shown in horizontal section; and Fig. 2 is an irregular vertical section, disclosing the various shafts and connecting rods of the brake in operative, assembled relation to each other.

The invention, as embodied in the accompanying drawings, includes as its essential elements, a brake beam, a controlling shaft which is rotatable for applying or releasing the brake shoes, and a crank shaft which operates the controlling shaft and is adapted to be connected either to a horizontal tail lever or a vertical side lever.

The brake beam designated by the numeral 10 is of conventional design and is swingingly suspended beneath the rear hounds 11 of the vehicle by links 12 which are secured at their free terminals to the transverse supporting bar 13 mounted upon the upper faces of the hounds and terminally extended beyond the outer sides thereof. Brake shoes 14 of conventional type are carried by the terminals of the brake beam for engagement with the rear wheel at a point below the plane of the axles, whereby the maximum leverage will be exerted by the brake beam upon the wheel.

A controlling shaft 15 extends transversely between the hounds, being terminally journaled in bearings 16 secured to the lower faces of the hounds, adjacent the rear terminals thereof. A crank 17 is formed in the controlling shaft, whereby this member may be operatively connected to the brake beam by means of a connecting rod 18. The terminals of the rod 18 are provided with yokes 19, one of which is engaged about the crank 17 and the other of which is secured to the attaching eye 20 carried by the brake beam at the approximate center thereof. A second crank 21 formed in the shaft 15 extends at an angle to the crank 17. The function of this second crank will be hereinafter disclosed.

The operating shaft 22 which is terminally journaled above the hounds in bearing brackets 23, mounted therefrom, is provided with three cranks 24, 25 and 26. The members 24 and 25 are disposed in parallel relation to each other and extend in the same direction from the shaft 21. The third crank 26 extends in parallel relation to the cranks 24 and 25 and lies in a plane common to these members but extends on the diametrically opposite side of the crank. Extending between the crank 26 and the crank 21 is a connecting rod 27, the terminals of which are provided with yokes to receive the crank members.

From the foregoing description it will now be seen that a pull exerted upon either of the cranks 24, and 25, when these members are in vertical position, will cause the forward swinging of the depending crank 26, which movement will be communicated to the crank 21, through the connecting rod 27, with a resultant rotation of the controlling shaft 15 and a rearward swinging of the crank 17. The rearward swinging of this latter crank will cause the rearward movement of the brake beam and the consequent application of the brake shoe to the wheel.

The reason for which the two cranks 24 and 25 are provided for the operating shaft will now be apparent, for it will be seen that two separate levers 28 and 29 may be independently connected to the operating lever for actuating the same. The lever 28 constitutes the tail lever, while the lever 29 constitutes the vertical side lever. The tail lever is mounted for movement in a horizontal plane, being secured to the rear bolster 30 of the wagon by means of an attaching bracket 31, between the ears of which is held, by means of a pivot bolt 32, a terminal eye 33. A crank arm 34 is formed on this pivoted terminal of the tail lever. A rod 35 connects this crank arm and the crank 25 of the operating shaft. An opening indicated at 36 is provided in the rear bolster to accommodate this rod. As shown in Fig. 1, the tail lever may be swung in a horizontal plane to either apply or release the brake beam through the medium of the operating shaft. As a means for securing the tail lever in adjusted position, when the brake is set and for supporting it, at all times, I employ a ratchet band 37 which is substantially semi-circular in shape and is terminally secured to the rear bolster.

The vertical side lever 29 is provided with a horizontal extension 38, which constitutes a stub shaft. This stub shaft is journaled in brackets 40 mounted upon the upper face of the rear hounds and is formed with a crank 41. A rod 42 operatively connects the crank 41 and the crank 24. A pair of rings indicated at 43 are carried by the side lever so that a pole may be connected thereto, whereby the side lever may be controlled from an operator standing on the logs or other material in the wagon. The side lever may, of course, be attached by a chain, cable or rod to the foot lever at the forward end of the wagon in the well known manner. By removing either one of the connecting rods 35 or 42, either one of the levers 28 and 29 may be rendered inoperative at desired times.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A wagon brake including a brake beam, an operating shaft connected to the beam, a controlling shaft connected to the operating shaft, a lever mounted for movement in a horizontal plane, a lever mounted for movement in a vertical plane, and rods connecting the levers and the controlling shaft, whereby either one of said levers may be swung to rotate said controlling shaft for moving the brake beam into active position.

2. A vehicle brake including a swinging brake beam, an operating shaft having a pair of angularly opposed cranks, a rod connecting one of said cranks to the brake beam, a controlling shaft having three cranks, a pair of the cranks being similarly disposed and the third crank being diametrically opposed to the pair of cranks, a rod connecting the third crank to the second crank of the operating shaft, a lever mounted for movement in a horizontal plane, a lever mounted for movement in a vertical plane, and rods independently connecting said pair of cranks with said levers, whereby either one of said levers may be swung to rotate the controlling shaft with a consequent movement of the brake beam.

3. A vehicle brake including a swingingly mounted brake beam, an operating shaft extending in parallel relation thereto and provided with a pair of angularly opposed cranks, a rod connecting the first of said cranks to the brake beam, a controlling shaft provided with a plurality of cranks, a rod connecting one of said cranks with the second crank of the operating shaft, rods connected to the other cranks of the controlling shaft, a lever mounted for swinging movement in a horizontal plane, and a lever mounted for swinging movement in a vertical plane, said levers being connected to said last mentioned rod, whereby either one of said levers may be swung to actuate the brake beam.

In testimony whereof I hereunto affix my signature in the presence of two witnesses.

FIRDIA WATSON.

Witnesses:
 E. B. BARRON,
 A. L. BOEN.